(12) United States Patent
Guignard et al.

(10) Patent No.: US 12,490,144 B2
(45) Date of Patent: Dec. 2, 2025

(54) BUFFER STATUS REPORT SIGNALING BOTH BUFFERED UPLINK TRAFFIC AND BUFFERED DIRECT LINK TRAFFIC

(71) Applicant: CANON KABUSHIKI KAISHA, Tokyo (JP)

(72) Inventors: Romain Guignard, Rennes (FR); Patrice Nezou, Liffre (FR); Pascal Viger, Janze (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 18/005,036

(22) PCT Filed: Jul. 16, 2021

(86) PCT No.: PCT/EP2021/070016
§ 371 (c)(1),
(2) Date: Jan. 10, 2023

(87) PCT Pub. No.: WO2022/013437
PCT Pub. Date: Jan. 20, 2022

(65) Prior Publication Data
US 2023/0337050 A1   Oct. 19, 2023

(30) Foreign Application Priority Data

Jul. 17, 2020 (GB) ..................... 2011072

(51) Int. Cl.
*H04W 28/02* (2009.01)
*H04W 72/12* (2023.01)
*H04W 72/21* (2023.01)

(52) U.S. Cl.
CPC ....... *H04W 28/0278* (2013.01); *H04W 72/12* (2013.01); *H04W 72/21* (2023.01)

(58) Field of Classification Search
CPC .. H04W 28/0278; H04W 72/12; H04W 72/21
(Continued)

(56) References Cited

U.S. PATENT DOCUMENTS

2015/0188680 A1\* 7/2015 Li .................. H04W 28/0278
370/329
2017/0332385 A1\* 11/2017 Shirali ............ H04W 28/0278
(Continued)

FOREIGN PATENT DOCUMENTS

EP    2999289 A1    3/2016
GB    2552200 A     1/2018
WO    2016020881 A1 2/2016

*Primary Examiner* — Obaidul Huq
(74) *Attorney, Agent, or Firm* — Canon U.S.A., Inc., IP Division (57) ABSTRACT

An 802.11ax access point, AP, manage a granted transmission opportunity to schedule multi user uplink and downlink transmissions with non-AP stations. Resource units may also be allocated to non-AP stations for direct link, DiL, transmissions. To efficiently arbitrate between scheduling new MU UL transmissions or DiL transmissions, the AP must know the needs of the non-AP stations. The buffer status report, BSR, either solicited or unsolicited, provides an ACI Bitmap subfield and a Delta TID subfield to signal a number of TIDs for which buffered uplink traffic is declared. The BSR is amended so that these two subfields further signal, in addition to the buffered UL traffic, when there is buffered DiL traffic. Other subfields may provide more information on the amount of buffered DiL traffic.

15 Claims, 5 Drawing Sheets

(58) Field of Classification Search
USPC .................................. 370/310, 328, 329
See application file for complete search history.

(56) References Cited

U.S. PATENT DOCUMENTS

2019/0261402 A1   8/2019  Asterjadhi et al.
2020/0029350 A1*  1/2020  Asterjadhi ........ H04W 28/0268

* cited by examiner

BUFFER STATUS REPORT SIGNALING BOTH BUFFERED UPLINK TRAFFIC AND BUFFERED DIRECT LINK TRAFFIC

CROSS-REFERENCE TO RELATED APPLICATIONS

This application is the National Phase entry of PCT Application No. PCT/EP2021/070016, filed on Jul. 16, 2021 and titled "BUFFER STATUS REPORT SIGNALING BOTH BUFFERED UPLINK TRAFFIC AND BUFFERED DIRECT LINK TRAFFIC", which claims the benefit under 35 U.S.C. § 119(a)-(d) of United Kingdom Patent Application No. 2011072.2, filed on Jul. 17, 2020 and entitled "BUFFER STATUS REPORT SIGNALING BOTH BUFFERED UPLINK TRAFFIC AND BUFFERED DIRECT LINK TRAFFIC". The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The 802.11 family of standards adopted by the Institute of Electrical and Electronics Engineers (IEEE-®) provides a great number of mechanisms for wireless communications between stations.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the IEEE in the 802.11ax standard, draft version 6.0 (D6.0) of November 2019.

Scheduling MU transmissions is based on the transmission needs declared by the non-AP stations to the AP. Such declaration is usually made using a Buffer Status Report (BSR). With the BSR mechanism, the non-AP stations report to the AP the amount of data held in an emission buffer ready to be transmitted to the AP, i.e. the amount of buffered uplink (UL) traffic. The BSR mechanism is consequently adapted to report the amount of data held in the emission buffers corresponding to a given TID.

The information contained in the received BSRs makes it possible for the AP to select non-AP stations to which MU UL transmissions are offered and to design the allocated UL resource units (in terms of width and duration).

Knowledge of buffer statuses is therefore a critical point for the AP as it acts as the central control entity for the MU UL allocation: no knowledge or erroneous knowledge (e.g. outdated one) of the non-AP stations' buffer statuses may result in allocating erroneously-sized resource units and consequently in wasting bandwidth.

The adopted 802.11ax MU transmission scheme is not adapted to bandwidth-demanding communication services, e.g. video-based services such as gaming, virtual reality, streaming applications. This is because all the communications go through the AP, thereby doubling the air time for transmission but also the number of medium accesses (and thus of medium access time).

The Single User (SU) scheme of 802.11 network protocol allows a direct link (DiL, also called peer-to-peer (P2P) transmission) to be performed wherein the data (MAC) frames are addressed using the 48-bit IEEE MAC address of the destination station.

However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

SUMMARY OF INVENTION

As a consequence, one may contemplate to integrate DiL/P2P communications under the global policy of the AP's scheduling during a granted transmission opportunity, TxOP.

In this scheme, the AP acts as a central point for scheduling resource units at the BSS level within the granted TxOP. Resource units may be used for downlink (i.e. from the AP), uplink (i.e. to the AP) and DiL transmissions. A resource unit may thus be provided for DiL to peer stations.

One peer station manages the DiL resource unit, for example by subleasing or time sharing the resource with the corresponding peer station (with which the managing peer station has a direct link session established). This is efficient because the managing peer station usually has knowledge of the communication needs of the other peer station.

This two-level control of resource units results into an efficient and simple management of the resources, in particular for direct link communications.

Appropriate allocation of resource units for DiL transmissions requires that the AP has knowledge of the non-AP stations' needs, i.e. of buffered DiL traffic. However, the current version of data reporting according to the 802.11 standard does not allow to efficiently report the buffered DiL traffic to the AP.

Publication GB2571250 discloses a mechanism to report DiL buffer status to the AP. This mechanism is not fully satisfactory because it is based on a brand-new frame.

It is a broad objective of the present invention to overcome some of the foregoing concerns at both the peer side and the AP side.

The present invention proposes to integrate the DiL buffer report into the current BSR of the 802.11 standard in order to follow the same report format while being able to report simultaneously UL and DiL needs.

In this context, the invention first provides a communication method in a wireless network, comprising at a peer station (usually a non-AP station):
  providing, in a frame sent to a central station (usually the AP), a Buffer Status Report, BSR, control field reporting a status of buffered data,
  wherein a number of traffic identifiers for which there is buffered uplink, UL, traffic, is signaled using two subfields in the BSR control field, wherein the two subfields in the BSR control field also signals whether there is buffered direct link, DiL, traffic.

The invention also provides a communication method in a wireless network, comprising at a central station (usually an AP):

receiving, from a peer station (usually a non-AP station), a frame comprising a Buffer Status Report, BSR, control field reporting a status of buffered data,
  wherein a number of traffic identifiers for which there is buffered uplink, UL, traffic, is signaled using two subfields in the BSR control field,
  wherein the two subfields in the BSR control field also signals whether there is buffered direct link, DiL, traffic, and scheduling, based on the received BSR control field, a DiL resource unit to the peer station during a transmission opportunity granted to the central station.

The inventors propose to use the "not applicable" values of the first two subfields of the standardized BSR control field in order to signal DiL needs. This advantageously allows UL needs to be simultaneously signaled (with the DiL needs) while keeping the standardized BSR format (in terms of subfields).

Correlatively, the invention also provides a wireless communication device comprising at least one microprocessor configured for carrying out the steps of any of the above methods.

Optional features of embodiments of the invention are defined in the appended claims. Some of these features are explained here below with reference to a method, while they can be transposed into device features.

In some embodiments, the peer station belongs to a basic service set managed by the central station and the signaling of the buffered DiL traffic by the two subfields further signals whether the buffered DiL traffic is related to a DiL session with another peer station belonging to the BSS or not. This information (DiL session within the BSS or not) advantageously allows the central station to apply efficient RU scheduling policies, for instance to promote transmissions within its BSS rather than outside or to limit risks of interferences by allocating appropriate RUs (e.g. 20 MHz RUs or multiple thereof) for DiL sessions outside the BSS.

In some embodiments, the two subfields are made of the ACI Bitmap subfield and the Delta TID subfield as defined in the 802.11ax standard, version D6.0.

In some embodiments, one or more values from amongst values 0, 1 and 2 are used in the Delta TID subfield to signal buffered DiL traffic when the ACI Bitmap subfield has no bit set to 1. This approach reuses "not applicable" values to signal buffered DiL traffic when there is no buffered UL traffic in the peer station or buffered UL traffic for all eight traffic identifiers.

According to an optional feature, one of the values is used in the Delta TID subfield to signal buffered DiL traffic when there is no buffered UL traffic and another separate value is used in the Delta TID subfield to signal buffered DiL traffic when there is buffered UL traffic for all traffic identifiers (eight in 802.11ax). This makes it possible for the peer station to declare buffered DiL traffic in both cases where it has no buffered UL traffic or buffered UL traffic for all eight TIDs.

In some embodiments, one or more values from amongst values 2 and 3 are used in the Delta TID subfield to signal buffered DiL traffic when the ACI Bitmap subfield has one bit set to 1. Similarly, this approach reuses "not applicable" values to signal buffered DiL traffic when there is buffered UL traffic in the peer station for a single access category.

In some embodiments, value 3 is used in the Delta TID subfield to signal buffered DiL traffic when the ACI Bitmap subfield has two bits set to 1. In such a way, the peer station may simultaneously declare both buffered DiL traffic and buffered UL traffic for two access categories.

In some embodiments, an amount of buffered traffic including the buffered DiL traffic or an estimated transmission time required to transmit buffered traffic including the buffered DiL traffic is signaled in additional subfields of the BSR control field. This may help the AP efficiently designing allocated DiL RUs. Various formats for declaring the amount/transmission time of buffered DiL traffic may be contemplated, sometimes depending on whether an amount of buffered UL traffic has to be signaled.

In some embodiments, the BSR control field reports a status of buffered DiL traffic stored in the peer station.

In a variant, the BSR control field reports a status of buffered DiL traffic stored in another peer station with which the peer station has established a DiL session.

The peer station may thus report its own DiL needs or those of the other peer station with which it has a peer-to-peer communication. This mostly depends on which peer has data to send to the other.

In some embodiments, the frame including the BSR control field is sent (or received by the central station) in response to a BSR polling, BSRP, initiated by the central station, wherein the BSR polling specifies a type of the solicited BSR from amongst a DiL-only BSR, an UL-only BSR and a DiL-and-UL BSR. Specific polling may thus be implemented for instance to obtain more or less detailed information (e.g. on the amount of buffered data).

In some embodiments, the BSR control field of the DiL-and-UL BSR type reports buffered DiL traffic and reports buffered UL traffic for a preferred access category, AC, only. This allows the amount of buffered traffic to be specified for both the UL traffic and the DiL traffic. Consequently, the central station has a good knowledge of the main (preferred) data the peer station wishes to transmit.

In some embodiments, the frame is an 802.11 QoS Null frame or an 802.11 QoS Data frame.

In some embodiments, the method further comprises, at the peer station:
  determining that UL traffic is buffered for two or more access categories, and
  responsive to determining there is (also) buffered DiL traffic, forcing to signal, in the BSR control field, buffered UL traffic for a single preferred access category. This approach makes it possible to efficiently reuse the "not applicable" values as currently defined in the 802.11 standard, while being able to provide the amount of buffered data for both UL and DiL traffics.

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

Figure 1:
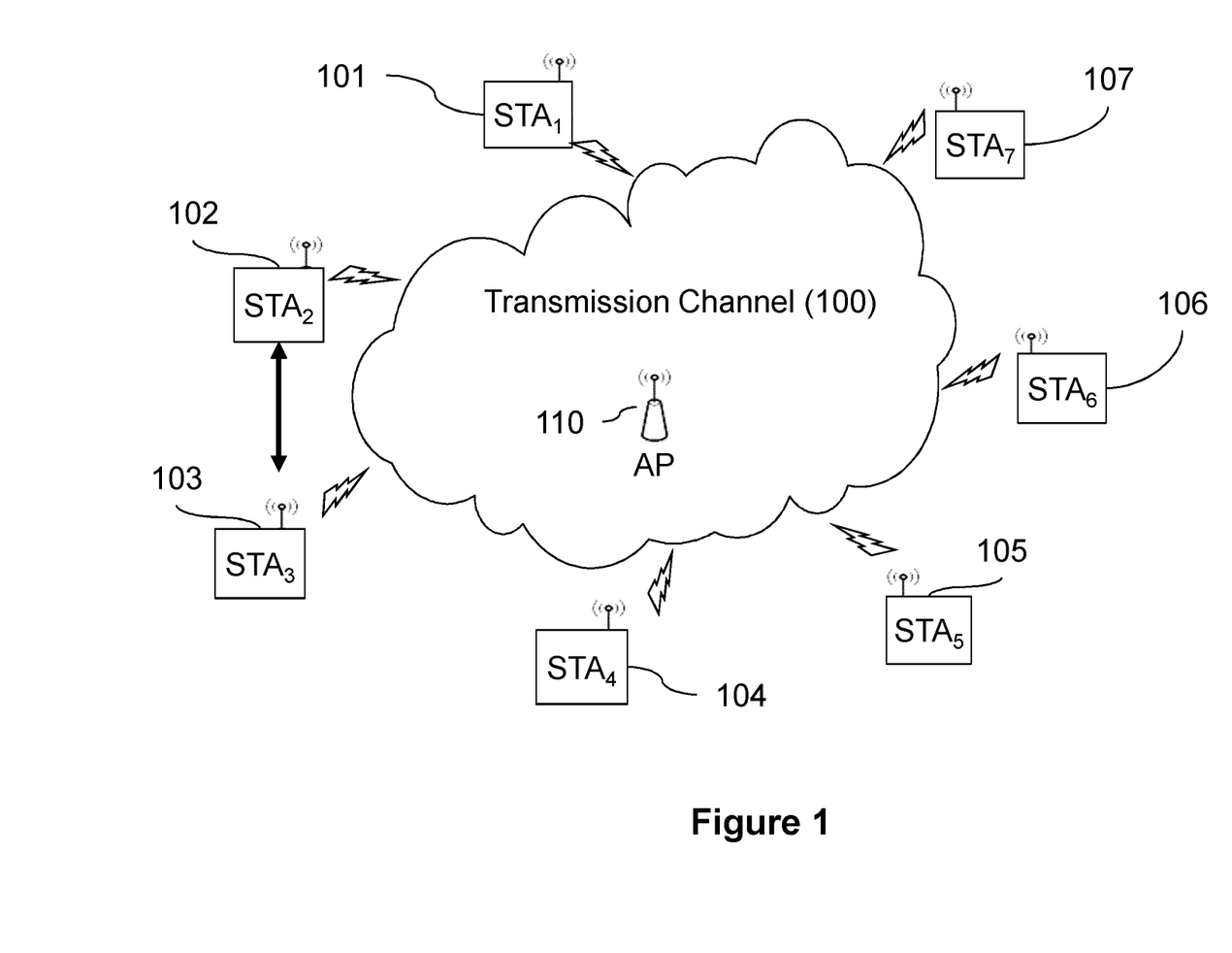
FIG. 1 illustrates a typical 802.11 network environment in which embodiments of the invention may be implemented.

FIG. 1 illustrates an exemplary communication system in which several communication stations 101-107, 110 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel. The AP 110 and the associated non-AP stations 101-107 may represent a basic service set (BSS) or an extended service set (ESS).

Two non-AP stations 102, 103 may also communicate directly via a direct wireless link (DiL for direct link) regardless of whether both non-AP stations belong to the same BSS or ESS. In a variant, direct communications between non-AP stations can be implemented without the use of the access point (known as an Ad-hoc mode). For instance, WiFi-Direct standard allows devices to communicate directly over the 802.11 wireless medium without the need for any AP.

Exemplary situation of direct communications, corresponding to an increasing trend nowadays, is the presence of peer-to-peer (P2P) transmissions between non-AP stations having the same primary channel, be them from the same BSS or ESS, or not. Technologies that support P2P transmissions between non-AP STAs not associated with the same BSS/ESS or no BSS include for example WiFi-Miracast® and Wireless Display scenario, in addition to WiFi-Direct. Other technologies that support P2P transmissions within a BSS/ESS include Direct Link Setup (DLS)

and Tunneled Direct Link Setup (TDLS). Even if P2P flows are usually not numerous, the amount of data per flow tends to be important, typically low-compressed video, from 1080p60 up to 8K UHD resolutions.

Each non-AP stations 101-107 registers to the AP 110 during an association procedure where the AP assigns a specific Association IDentifier (AID) to the requesting non-AP station. For example, the AID is a 16-bit value uniquely identifying the non-AP station.

The stations 101-107, 110 may compete one against another using EDCA (Enhanced Distributed Channel Access) contention, to access the wireless medium 100 in order to be granted a transmission opportunity (TXOP) and then transmit (single-user, SU) data frames. The stations may also use a multi-user (MU) scheme in which a single station, usually the AP 110, is allowed to schedule a MU transmission, i.e. multiple simultaneous transmissions to or from other stations, during a TXOP granted in the wireless network. One implementation of such a MU scheme has been for example adopted in IEEE 802.11ax amendment standard, as the Multi-User Uplink and Downlink OFDMA (MU UL and DL OFDMA) procedures. Thanks to the MU feature, a non-AP station has the opportunity to gain access to the wireless medium via two access schemes: the MU scheme and the conventional Enhanced Distributed Channel Access—EDCA (Single User) scheme.

During the MU DL transmission on the granted communication channel, the AP performs multiple simultaneous elementary transmissions, over so-called resource units (RUs), to various non-AP stations. As an example, the resource units split the communication channel of the wireless network in the frequency domain, based for instance on Orthogonal Frequency Division Multiple Access (OFDMA) technique. The assignment of the RUs to the non-AP stations is signaled at the beginning of the MU Downlink frame, by providing an association identifier (AID) of a non-AP station (individually obtained by each station during its association procedure with the AP) for each RU defined in the transmission opportunity.

During the MU UL transmission, various non-AP stations can simultaneously transmit data to the AP over the resource units forming the communication channel. To control the MU UL transmission by the non-AP stations, the AP previously sends a control frame, known as a Trigger Frame (TF). The Trigger Frame allocates the resource units to the non-AP stations of the same BSS, using 16-bit Association IDentifiers (AIDs) assigned to them upon registration to the AP and/or using reserved AIDs designating a group of non-AP stations. The TF also defines the start of the MU UL transmission by the non-AP stations as well as the length thereof.

A variant to trigger UL transmission relies on the use of a TRS (standing for Trigger Response Scheduling) control subfield. Such TRS control subfield is added to the DL data frames the AP sends to non-AP stations over resource units (MU DL transmission) in order to provide resource unit allocations to the addressee non-AP stations for a subsequent MU UL transmission. Each TRS subfield only allocates a single resource unit (and provides transmission parameters) for the addressee non-AP station that receives the DL data frame.

The description below mostly concentrates on the trigger frame to trigger an UL transmission, rather than the TRS control subfield. However, one skilled in the art is able to adapt the teachings below to the case of the TRS control subfield.

The non-AP stations involved at the same time in DiL communications (within or outside the BSS) and in MU transmissions in the BSS network have their transmission queue(s) served with data from both traffic modes: DiL and UL.

Management of quality of service (QoS) has been introduced at station level in the wireless networks, through well-known EDCA mechanism defined in the IEEE 802.11e standard. EDCA (Enhanced Distributed Channel Access) mechanism defines four traffic access categories (ACs) or «priorities» to manage access to the medium: a voice access category (AC_VO), a video access category (AC_VI) both reserved for real-time applications (e.g. voice or video transmission), a best effort access category (AC_BE) for standard applications and a background access category (AC_BK) when traffic is low.

Four corresponding emission buffers (or transmission/traffic queues or buffers) are provided: each AC has its own traffic queue/buffer to store corresponding traffic (data frames such as MSDUs or A-MSDUs) to be transmitted on the network. The data frames, namely the MSDUs, incoming from an upper layer of the protocol stack are each provided with an 802.1D priority or User priority (UP) or traffic type (TID—standing for Traffic Identifier) taking values in the range 0-7. Based on their TID, the MSDUs are mapped, using mapping rules, onto one of the four AC queues/buffers to be stored in the mapped AC buffer. Of course, another number of traffic queues may be contemplated.

Since the AP performs contention on behalf of the non-AP stations in the Uplink OFDMA, it should be aware of both the non-AP stations having (in their buffers) uplink traffic (MSDUs) to transmit and the amount of buffered UL traffic.

The 802.11 standard proposes that the 802.11ax non-AP stations send a buffer status report (BSR) to the AP to report the buffered traffic.

Figure 2:
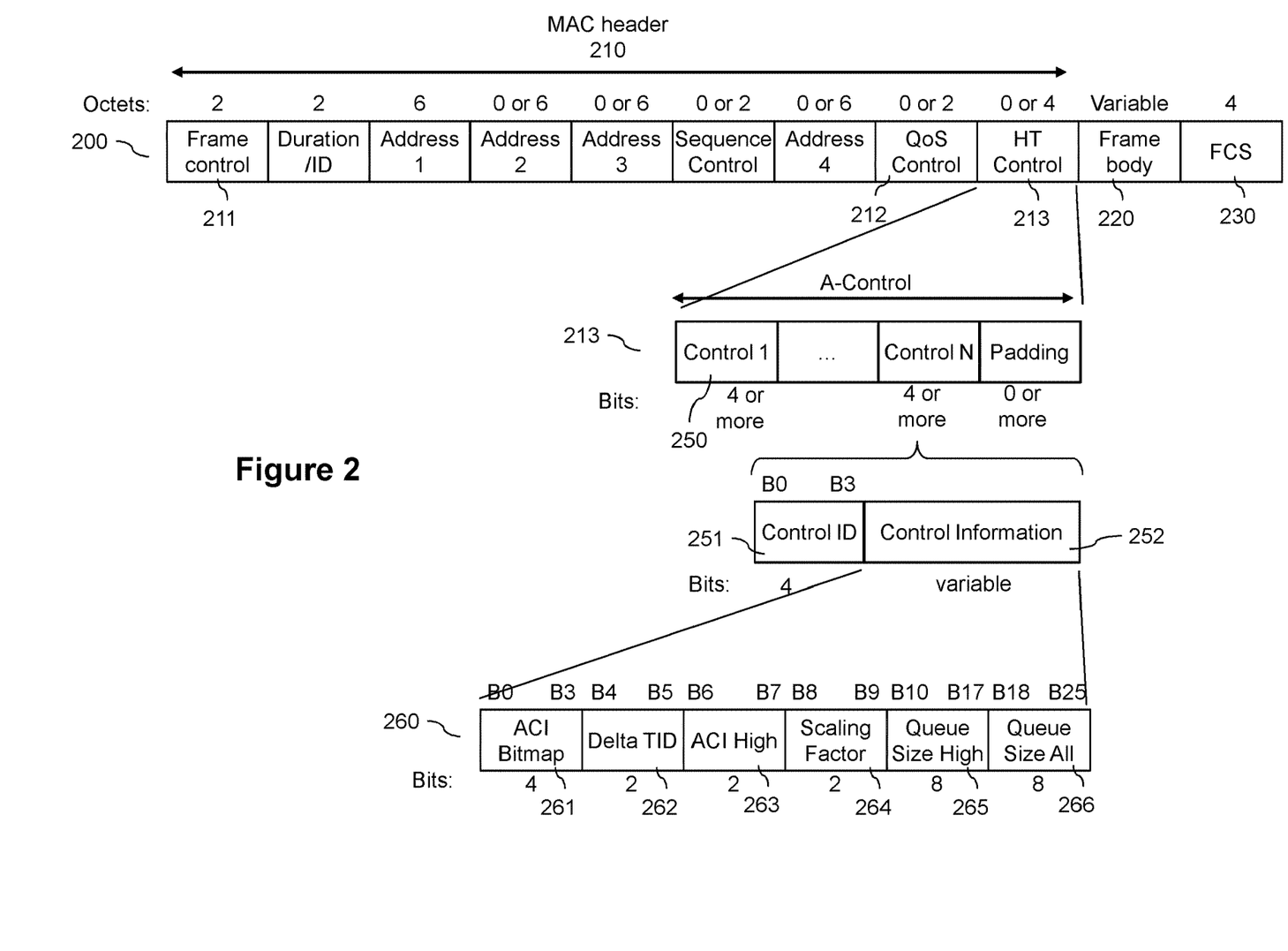
FIG. 2 illustrates the standardized 802.11ax Buffer Status Report.

The BSR is included in a BSR control field provided in MAC data frames, as illustrated in FIG. 2.

The MAC data frame 200 comprises a MAC header 210, a frame body 220 and a FCS field 230. The MAC header 210 includes, amongst other fields, a Frame Control header 211, a QoS control field 212 and a HT control field 213. The QoS control field 212 may be used by non-HE non-AP station (i.e. not 802.11ax) to report buffer status.

802.11ax non-AP station use the HT control field 213 to do so.

The HT-Control field 213 may aggregate multiple control fields, resulting in a sequence of one or more Control subfields 250. The length of the aggregated control field (A-Control field) 213 is equal to 30 bits.

Each Control subfield 250 includes a Control ID 251 subfield indicating the type of information carried in the Control Information subfield 252 that follows. Padding bits are added if necessary to reach the 30 bits of the A-Control field.

Various type of information may thus be provided through the A-Control field 213 depending on the Control ID 251. For instance, operating mode may be indicated in Control Information subfield 252 when Control ID 251 is 1. Also, power data may be indicated in Control Information subfield 252 when Control ID 251 is 4.

If Control ID subfield 251 is 3, Control Information subfield 252 of the Control subfield 250 contains buffer status information in the format of a BSR control field shown in the Figure under reference 260.

A non-AP station may report the buffer status for a preferred AC or for all AC queues.

The Buffer Status Information 260 is made up of six subfields: ACI Bitmap 261, Delta TID 262, ACI High 263, Scaling Factor 264, Queue Size High 265 and Queue Size All 266.

A number $N_{TID}$ of traffic identifiers for which there is buffered uplink, UL, traffic, is signaled using the first two subfields in the BSR control field 260, namely ACI Bitmap 261 and Delta TID 262.

ACI Bitmap subfield 261 has four bits and indicates the access categories for which the buffer status is reported. Each bit of the ACI Bitmap subfield 261 is associated with one of the four ACs and is set to 1 to indicate that the buffer status of the corresponding AC is included in the Queue Size All subfield 266, otherwise it is set to 0.

Exception is made for the particular case where the buffer statuses for all eight TIDs are included in the Queue Size All subfield 266. In that case ACI Bitmap subfield=0 is combined with Delta TID subfield 262 set to 3.

Delta TID subfield 262 together with the values of the ACI Bitmap subfield, indicate the number of TIDs for which the non-AP station is reporting the buffer status. The table below gives the relationships between these two subfields and the number of TIDs. The table comes from table 9-24d of document 802.11ax, version 6.0.

| Number $N_{bit}$ of bits in ACI Bitmap subfield 261 that are set to 1 | Mapping of Delta TID subfield value and number of TIDs, $N_{TID}$ |
| --- | --- |
| 0 | Values 0 to 2 are not applicable; Value 3 indicates 8 TIDs (i.e., all ACs have traffic) |
| 1 | Value 0 indicates 1 TID; Value 1 indicates 2 TIDS; Values 2 to 3 are not applicable; |
| 2 | Value 0 indicates 2 TIDs; Value 1 indicates 3 TIDs; Value 2 indicates 4 TIDs; Value 3 is not applicable; |
| 3 | Value 0 indicates 3 TIDs; Value 1 indicates 4 TIDS; Value 2 indicates 5 TIDs; Value 3 indicates 6 TIDS; |
| 4 | Value 0 indicates 4 TIDs; Value 1 indicates 5 TIDS; Value 2 indicates 6 TIDs; Value 3 indicates 7 TIDs; |

ACI High subfield 263 is used to indicate the ACI (Access Control Identifier) of a preferred AC for which the amount of buffered traffic is specified in Queue Size High subfield 265.

Scaling Factor subfield 264 indicates the unit SF, in octets, of Queue Size High and Queue Size All subfields 265, 266.

Queue Size High subfield 265 indicates the amount of buffered traffic, in units of SF octets, for the AC identified by ACI High subfield 263 that is intended for the station (usually the AP) identified by the receiver address of the MAC frame 200.

Queue Size All subfield 266 indicates the amount of buffered traffic, in units of SF octets, for all the ACs identified by ACI Bitmap subfield 261 that is intended for the station (usually the AP) identified by the receiver address of the MAC frame 200.

The queue size values set in Queue Size High and Queue Size All subfields 265, 266 are the total sizes, rounded up to the nearest multiple of SF octets, of all MSDUs and A-MSDUs buffered at the non-AP station reporting its buffer statuses.

The standardized BSR is dedicated to the reporting of buffer statuses for uplink traffic, i.e. data intended for the AP. However, with the introduction of the direct link (DiL) transmission, the non-AP stations may have their transmission queue(s) served with both DiL and UL traffic.

Therefore, there is a need to provide mechanisms to report buffer statuses for DiL traffic also, and preferably that can provide both DiL and UL buffer statuses. This is for the AP to efficiently schedule the non-AP stations for UL and DiL transmissions.

The present invention proposes to use the same two subfields in the BSR control field, namely ACI Bitmap 261 and Delta TID 262, to also signal when there is buffered direct link, DiL, traffic.

To do so, it is proposed to use the "non applicable" values to warn the AP that there is buffered DiL traffic.

For instance, one or more values from amongst "non applicable" values 0, 1 and 2 are used in the Delta TID subfield 262 to signal buffered DiL traffic when the ACI Bitmap subfield 261 has no bit set to 1 ($N_{bit}$=0). This is the first line in the above table: the non-AP station has no buffered UL traffic (or has buffered traffic for all eight TIDs).

The three Delta TID values available (when $N_{bit}$=0) may be used to signal different information.

For instance, one value (e.g. 0) may signal that there is buffered DiL traffic and that this buffered DiL traffic is related to a DiL session with another peer station belonging to the BSS (managed by the AP to which the BSR is to be sent); and another value (e.g. 1) may signal that there is buffered DiL traffic and that this buffered DiL traffic is related to a DiL session with another peer station not belonging to the BSS. Consequently, the signaling of the buffered DiL traffic by the two subfields 261, 262 further signals whether the buffered DiL traffic is related to a DiL session with another peer station belonging to the BSS or not.

This information (DiL session within or outside the BSS) may be used by the AP to apply different scheduling rules to provide transmission opportunities to the non-AP stations. For example, the AP may decide to promote (i.e. give priority) DiL transmission inside the BSS for instance to apply Spatial Reuse mechanisms. Alternatively, it may select a transmission process or the RU width depending on the belonging or not to the BSS: for a DiL session outside the BSS, it would be more suitable to schedule single user PPDU (i.e. RU of 20 MHz width or of a multiple thereof) for interference purposes, while DiL RUs shorter than 20 MHz could be allocated to peer stations belonging to the BSS.

In another example, one value (e.g. 0 or 1) may be used in the Delta TID subfield 262 to signal buffered DiL traffic when there is no buffered UL traffic at all, and another value (e.g. 2) may be used to signal buffered DiL traffic when there is buffered UL traffic for all TDIs. In such a way, the signaling still allows the AP to be aware of whether the non-AP station has buffered UL data (for all TIDs) or no.

Of course, these embodiments may be combined or not to distinguish between buffered DiL data within the BSS and outside and to distinguish between no buffered UL data and buffered UL data for all TIDs. For instance, values 0 and 1 in Delta TID subfield 262 are used to distinguish between buffered DiL data within the BSS and outside when there is no buffered UL data, while value 2 signals buffered DiL data (regardless of the belonging to BSS) when there is buffered UL data for all TIDs. Alternatively, value 0 in Delta TID subfield 262 signals buffered DiL data (regardless of the belonging to BSS) when there is no buffered UL data, while values 1 and 2 are used to distinguish between buffered DiL data within the BSS and outside when there is also buffered UL data for all TIDs.

In another embodiment which may be combined with the $N_{bit}$=0 embodiment above, one or more values from amongst "non applicable" values 2 and 3 are used in the Delta TID subfield 262 to signal buffered DiL traffic when the ACI Bitmap subfield 261 has one bit set to 1 ($N_{bit}=1$). This is the second line in the above table: the non-AP station signals buffered UL traffic for a single AC.

Again, the two values (2 and 3) may be used to distinguish between buffered DiL data for a DiL session within the BSS and outside. For instance, value 2 in Delta TID subfield 262 indicates there is buffered DiL traffic with a peer station belonging to the BSS, while value 3 indicated buffered DiL traffic for a DiL session with a peer station outside the BSS. Note that with these two values, it is no longer possible to signal (in addition to the DiL traffic) whether the buffered UL traffic concerns one or two TIDs. Therefore, the no-AP station may, in that case, report buffered UL traffic for a preferred TID, only.

In a variant, the two values may be used to signal buffered DiL data (regardless of the belonging to BSS) and to distinguish between 1 and 2 TIDs for the reported buffered UL traffic.

In yet another embodiment which may be combined with one or both of the $N_{bit}=0$ and $N_{bit}=1$ embodiments above, "non applicable" value 3 is used in the Delta TID subfield 262 to signal buffered DiL traffic when the ACI Bitmap subfield 261 has two bits set to 1 ($N_{bit}=2$). This is the third line in the above table: the non-AP station signals buffered UL traffic for two ACs.

In that case, there is no distinction between a DiL session within the BSS and outside. Furthermore, when buffered DiL traffic is declared through this value, there is no longer an indication on the number of TIDs reported in the BSR. This is not prejudicial to the functioning (scheduling) of the AP as the number of TIDs may not be used.

The table below shows an exemplary use of the values declared as "non applicable" in the current version of the 802.11ax standard.

| Number of bits in the ACI Bitmap subfield that are set to 1 | Mapping of Delta TID subfield value and number of TIDs, NTID |
|---|---|
| 0 | Value 0 indicates buffered traffic for DiL within the BSS, while no buffered UL traffic; Value 1 indicates buffered traffic for DiL outside the BSS, while no buffered UL traffic; Value 2 indicates buffered DiL traffic and buffered UL traffic for 8 TIDs; Value 3 indicates 8 TIDs (i.e., all ACs have traffic) |
| 1 | Value 0 indicates 1 TID; Value 1 indicates 2 TIDs; Value 2 indicates buffered traffic for DiL within the BSS, and buffered UL traffic for 1 TID; Value 3 indicates buffered traffic for DiL outside the BSS, and buffered UL traffic for 1 TID; |
| 2 | Value 0 indicates 2 TIDs; Value 1 indicates 3 TIDS; Value 2 indicates 4 TIDs; Value 3 indicates buffered traffic for DiL and buffered UL traffic for 2 TIDs; |
| 3 | Value 0 indicates 3 TIDs; Value 1 indicates 4 TIDs; Value 2 indicates 5 TIDs; Value 3 indicates 6 TIDS; |
| 4 | Value 0 indicates 4 TIDs; Value 1 indicates 5 TIDs; Value 2 indicates 6 TIDs; Value 3 indicates 7 TIDS; |

To report buffered DiL data, the non-AP station participates to a DiL session with another peer non-AP station (regardless of whether it belongs or not to the BSS). In the DiL session, it may be the non-AP station or the other peer or both that have DiL traffic to send.

When the non-AP station itself does not store DiL traffic to emit (this is the other peer station that has DiL traffic), the BSR 260 can report a status of buffered DiL traffic stored in the other peer station with which the non-AP station has established a DiL session. Such information may have been exchanged during DiL session setup phase or through a buffer status report procedure between the two peer stations for instance. The non-AP station thus acts as a proxy and can forward the DiL needs of the other peer to the AP.

When the non-AP station itself stores DiL traffic to emit, the BSR 260 preferably reports a status of buffered DiL traffic stored in the peer station. Optionally, when the BSR further specifies the amount of buffered DiL traffic as explained below, it may report the sum of the DiL traffic buffered in the non-AP station and in the other peer station. An amount of buffered traffic including the buffered DiL traffic is thus signaled in the additional subfields of the BSR control field. In a variant, an estimated transmission time required to transmit buffered traffic including the buffered DiL traffic is signaled in additional subfields of the BSR control field.

To keep the format of the BSR control field 260, the other subfields 263-266 may be kept with the same usage, except that the Queue Size All subfield 266 may sum the amount of declared buffered UL traffic with the amount of buffered DiL traffic.

In a variant, the Queue Size All subfield 266 may be used to convey the amount of buffered DiL traffic only. The AP thus does not receive the amount of all buffered UL traffic as in the prior art.

Alternatively, a required DiL transmission duration may be indicated in Queue Size All subfield 266 instead of an amount of data. The non-AP station computes itself this duration based on the amount of buffered DiL data (locally or at the other peer side) and the modulation scheme intended for the DiL transmission. This makes it possible for the AP to better design the RU (width and length) allocated for DiL transmissions, thereby reducing bandwidth waste.

For the particular case where there is no buffered UL traffic ($N_{bit}=0$ and Delta TID value=0 or 1 in the example above), the subsequent subfields 263-266 (20 bits) are meaningless. Any number of the 20 bits can thus be used to precisely indicate the required DiL transmission duration. Alternatively, subfields 263-266 can be kept to indicate a preferred AC for buffered DiL transmission (subfield 263), a scaling factor 264, the amount of buffered DiL traffic for the preferred AC (subfield 265) and a total amount of buffered DiL traffic (subfield 266).

Figure 3:
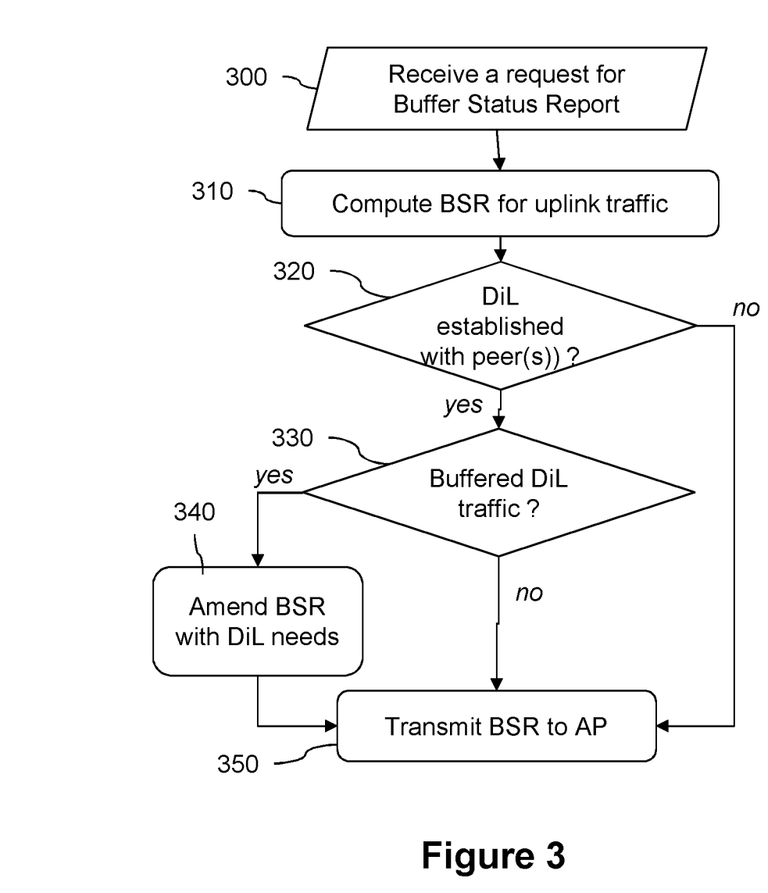
FIG. 3 illustrates, using a flowchart, general steps at non-AP stations for implementations of the present invention.

FIG. 3 illustrates, using a flowchart, general steps at the non-AP station implementing embodiments of the invention. This algorithm focuses on the building and sending of a Buffer Status Report by the non-AP station. Other operations at the non-AP station may remain conventional.

The AP and the non-AP station have previously (e.g. during registration) indicated their supports in the BSR Support subfield of their HE Capabilities element.

The algorithm starts at step 300 where the non-AP station receives a request for Buffer Status Report.

It may be an internal request, e.g. an unsolicited BSR triggered by the expiry of a local timer. In embodiments, the non-AP station may set the local timer to periodically inform the AP of its buffer status. In a variant, the internal triggering may be the storing (in the transmission buffers) of traffic for a new AC or may be the detection of a DLS establishment, and so on.

Alternatively, it may be an external request such as a Buffer Status Report Poll (BSRP) Trigger Frame sent by the AP for instance. The BSRP allows the AP to solicit BSR to non-AP stations.

In case of BSRP, the AP may allocate (in the BSRP trigger frame) resource units to specific non-AP stations by indicating their AID in the corresponding User Info fields. This is to obtain their BSR. It may also allocate (in replacement or in combination) resource units for random access to which several non-AP stations attempt to access in order to send their BSR.

It may be advantageous that the BSR polling by the AP specifies a type of the solicited BSR, e.g. from amongst a DiL-only BSR (no interest in buffered UL traffic, meaning $N_{bit}=0$), an UL-only BSR (currently standardized BSR) and a DiL-and-UL BSR (meaning $N_{bit} \neq 0$ can be used).

To do so, each allocated RU may contain an indication of the BSR type required by the AP: DiL, UL or both.

This indication may for example be provided on the allocated RU. Various signalling may be contemplated to provide this indication: using 1 bit (reserved bit in the current version of 802.11ax) of the User Info field; setting the AID12 field of the User Info field to a specific value indicating an RU for direct link while the AID of the non-AP station is encoded in a specific format in the Trigger Dependent Info field of the User Info field; or using any meaningless (in the case of DiL) subfield of the User Info field itself, such as bits B12 to B31. Any other signalling can be used in the context of the invention.

Next, at step 310, the non-AP station builds its BSR for UL needs (if the BSR type, if any, indicated in the BSR request requires it). To do so, the various subfields 261-266 are filled in a conventional manner:

the ACs of buffered UL traffic are indicated in ACI Bitmap subfield 261,

Delta TID subfield 262 is encoded (see first table above) to indicate the number of TIDs concerned, the preferred AC is chosen and indicated in ACI High subfield 263; its buffer size is specified in Queue Size High subfield 265 together with the SF subfield 264, finally, the total amount of buffered UL traffic for the ACs indicated in ACI Bitmap subfield 261 is specified in Queue Size All subfield 266, given the scaling factor.

Once the "conventional" BSR 260 is created, the non-AP station checks, at step 320, whether it has an established Direct Link session with another peer station(s). This is not the object of the present document to describe the way the two peer stations establish such direct link session. The stations can for example follow the procedure described in the 802.11 specification.

In case, there is no direct link session established, the non-AP station directly transmits the BSR to its associated AP in step 350. For instance, the BSR control subfield 260 is included in an 802.11 QoS Null frame or an 802.11 QoS Data frame (any data frame sent to the AP) and more generally in any management frame.

Otherwise (a direct link session is detected), the non-AP station checks at step 330 whether there is pending DiL data (either stored locally or reported by the other peer station of the Direct Link session(s)).

If no DiL traffic is buffered, the non-AP station transmits the "conventional" BSR to the AP at step 350 as described above.

Otherwise, if there is buffered DiL data, the non-AP station amends at step 340 the BSR to include the DiL needs.

To modify the BSR, the non-AP station first evaluates the current BSR to determine whether buffered UL traffic is declared. For instance, if both subfields of Queue Size High and Queue Size All are set to 0, there is no need for UL transmission or if both subfields of Queue Size High and Queue Size All are set to 255, the amount of buffered traffic is unknown or unspecified. To indicate, there is no need for uplink, ACI Bitmap and Delta TID subfields 261, 262 may be set to 0.

If there is no buffered UL traffic declared, the BSR is for DiL only. The non-AP station can modify Delta TID subfield 262 (ACI Bitmap field is already set with $N_{bit}=0$) to declare the buffered DiL traffic: for instance, Delta TID is set to 0 if the DiL traffic is for a DiL within the BSS or set to 1 fora DiL outside the BSS. The subsequent subfields 263-266 are modified, as proposed above, to specify an amount of buffered DiL traffic or an equivalent required DiL transmission duration.

In one optional embodiment, if buffered UL traffic is declared for all 8 TIDs ($N_{bit}=0$ and Delta TID=3), the BSR may be modified to set Delta TID=2, to declare DiL needs. Queue Size All 266 may be modified to add the amount of buffered DiL traffic or to set this amount (or equivalent DiL transmission duration) in replacement of the total amount of UL traffic as set at step 310, while ACI High, SF and Queue Size High subfields 263, 264, 265 can remain unchanged.

In embodiments, if buffered UL traffic is declared (whatever the number of TIDs concerned; alternatively, for such a number from 1 to 7) meaning BSR mixes DiL and UL report, the non-AP station may force to signal, in the BSR control field, buffered UL traffic for a single preferred access category.

To do so, ACI Bitmap subfield 261 is set to indicate the ACI High of the UL traffic only: 1 is set in the bit corresponding to the ACI High subfield 263 and other bits are set to 0 (thus $N_{bit}=1$). To declare DiL needs, the non-AP station modifies Delta TID subfield 262: for instance, Delta TID is set to 2 if the DiL traffic is for a DiL within the BSS or set to 3 for a DiL outside the BSS. Queue Size All subfield 266 is modified, as proposed above, to add the amount of buffered DiL traffic or to set this amount (or equivalent DiL transmission duration) in replacement of the total amount of UL traffic as set at step 310, while ACI High, SF and Queue Size High subfields 263, 264, 265 can remain unchanged.

These embodiments are good tradeoffs between compacity (one BSR control subfield) and useful information (the number of TIDs is undefined or limited to 1).

In another embodiment, the non-AP station may signal the DiL needs and uplink needs using two Control subfields 250 to provide two BSRs (Control ID 251=3), one for each of DiL and UL needs. The DiL needs may thus be declared using $N_{bit}=0$, meaning that bits B6-B25 are available to provide detailed information on the buffered DiL traffic.

Figure 4:
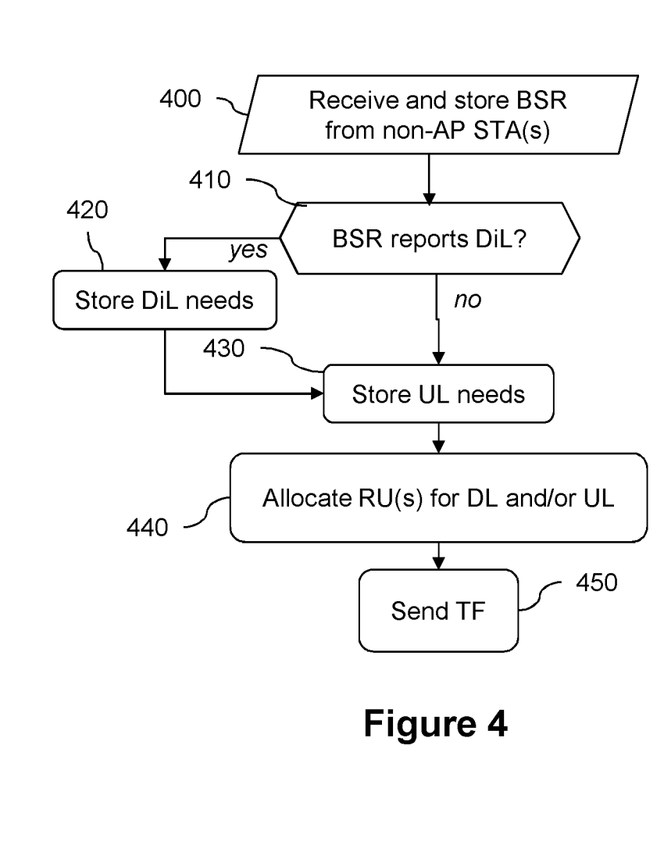
FIG. 4 illustrates, using a flowchart, general steps at an AP for implementations of the present invention.

FIG. 4 illustrates, using a flowchart, general steps at the AP implementing embodiments of the invention. This algorithm focuses on the allocation of resource units based on the received BSR. Other operations at the AP may remain conventional.

The algorithm starts at step 400 where the AP receives the BSR from one or more non-AP stations. The BSR may be solicited by the AP (i.e. received in response to a BSRP trigger frame) or unsolicited (i.e. responsive to a decision of the non-AP station).

The AP stores the received BSR in its internal memory and starts to parse the received BSRs upon reception.

At step 410, the AP checks whether the received BSR reports buffered DiL traffic based on the values of the ACI Bitmap and Delta TID subfields 261, 262 as described above. These values thus indicate the presence or absence of DiL needs for the emitting non-AP station.

In the affirmative of test 410, the AP stores at step 420 the DiL needs of the non-AP station and information relative to those needs. For instance, the AP stores the declared amount of buffered DiL data or equivalent required transmission duration, from the appropriate subfields: Queue Size All subfield 266 or by removing the Queue Size High subfield value from the Queue Size All subfield value in case the number of UL traffic TID is limited to 1.

In cases, the AP only knows the needs for both UL and DiL without knowing the data amount needed.

The AP may also store an indication as to whether the DiL needs so declared concern a DiL session within the BSS or outside.

Next and when no DiL is reported, the AP stores the information for UL needs at step 430 in a conventional manner.

The AP gets the Queue Size High which indicates the amount of data buffered by the non-AP station for the ACI High Access Category. If no DiL is reported (algorithm goes directly from step 410 to step 430), the AP retrieves the number of TIDs (based on the ACI bitmap and Delta TID) and access categories for which the buffer status is reported. Queue Size All subfield indicates the amount of buffered traffic, for all the ACs identified by the ACI Bitmap subfield.

Next, at step 440, the AP allocates, based on all this retrieved information, RU(s) for uplink and/or direct link to selected stations from the BSRs to form a next trigger frame over a composite channel. In other words, the AP may schedule, based on the received BSR control field, a DiL resource unit to the peer station during a transmission opportunity granted to the central station.

Once the RU allocation is performed, the AP sends, at step 450, a (data) trigger frame triggering the MU UL and/or DiL transmission, thereby causing one or more selected stations to transmit in the allocated RUs.

Figure 5:
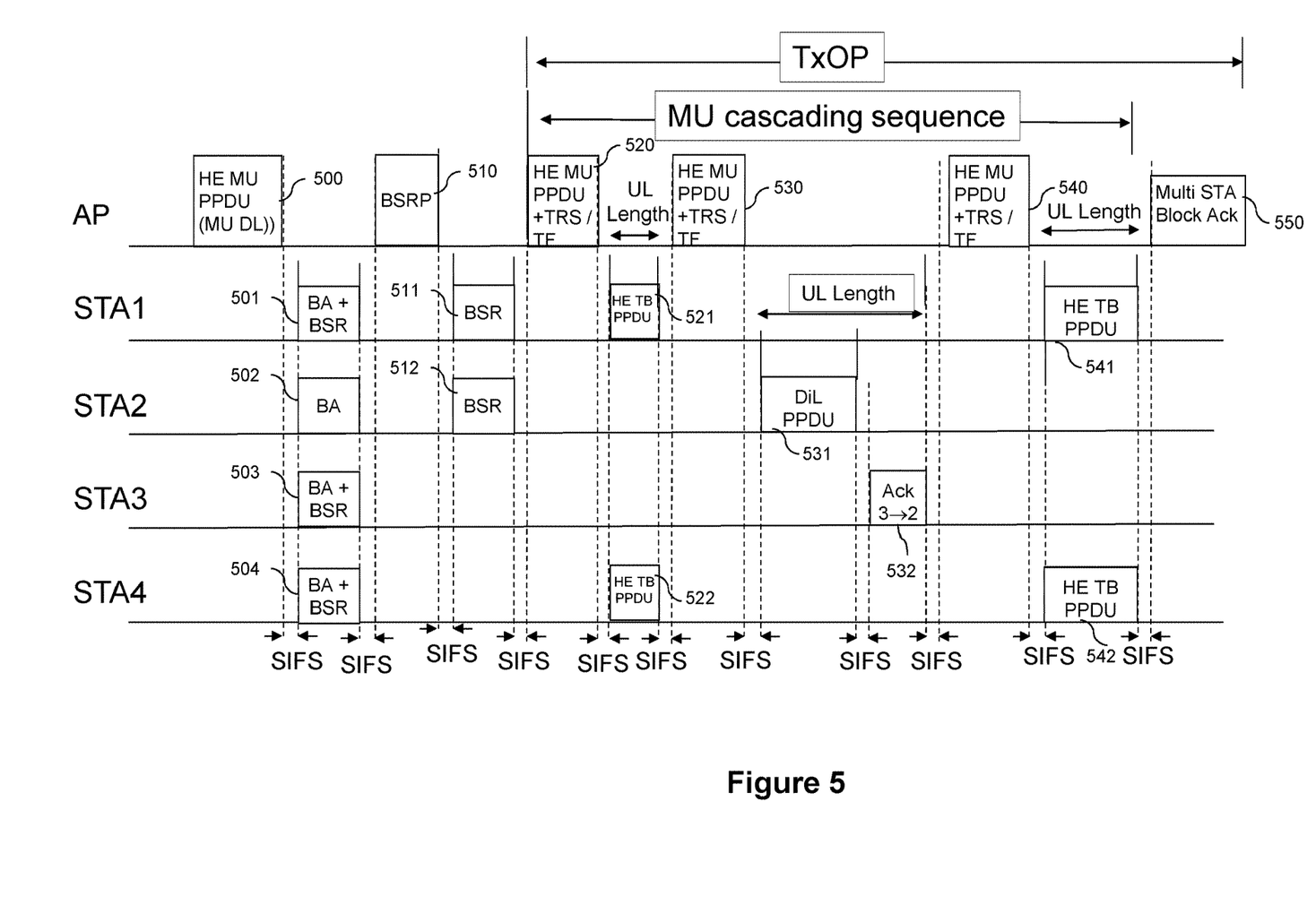
FIG. 5 illustrates an exemplary scenario of communication in which embodiments of the invention are implemented.

FIG. 5 illustrates an exemplary scenario of BSR exchange followed by a RU scheduling during a TxOP granted to the AP. In this scenario, a first phase provides the AP with UL and DiL needs of the non-AP stations, then the AP provides a cascading sequence of various transmissions, including Uplink (UL), Downlink (DL) and/or DiL transmissions. Alternatively, the BSR exchange may occur during a cascading sequence of UL, DL and DiL transmissions.

Unsolicited BSR and solicited BSR are illustrated, although the invention is not limited to such schemes. In the unsolicited BSR, the non-AP stations piggyback an existing frame (a BA frame in the example) to transmit their BSR. The solicited BSR is in response to a polling (BSRP).

In the scenario shown, two non-AP stations of the BSS (STA2 and STA3) have established a direct link session prior to the current sequence. This is not the object of the present document to describe the way the two peer stations establish such direct link session. The stations can for example follow the procedure described in the 802.11 specification.

Two other stations (STA 1 and STA4) have some data to transmit to the AP.

The scenario starts with a Downlink transmission by the AP. A Downlink Multi-User PPDU 500 is thus sent to STA1, STA2, STA3 and STA4, each being assigned to an own resource unit to receive particular data. At the end of the MU DL transmission and after a SIFS period, each non-AP station acknowledges the DL transmission by sending a block ack frame (respectively 501 for STA1, 502 for STA2, 503 for STA3 and 504 for STA4).

Stations STA1, STA3 and STA4 take this opportunity to send a block ack frame to voluntarily (i.e. unsolicited) report their buffer status to the AP. A BSR control subfield as described above is thus created (using for instance the algorithm of FIG. 3) and added to the block ack frame.

STA4 may report UL needs; STA3 may report DiL needs; STA1 may report UL and DiL needs but without providing details on the DiL needs (e.g. $N_{bit}=2$ in ACI Bitmap and Delta TID=3). STA2 does not provide BSR.

After a SIFS duration following the end of the Block Ack reception, the AP sends Buffer Status Report Poll Trigger Frame 510 to obtain STA1 and STA2 BSRs, for instance because it does not have any needs from STA2 and because it wishes to know more about the STA1's DiL needs.

As being a trigger frame, the BSRP allocates one RU to STA1 and one RU to STA2, for them to reply with their BSR. The RUs may be signaled as being dedicated to DiL in order to request a DiL-only BSR from the two non-AP stations. Of course, UL-only BSR and UL-and-DiL BSR may alternatively be requested by the AP.

Upon reception of the DiL-only BSRP, STA1 and STA2 create their BSR (see FIG. 3) and transmit them to the AP after a SIFS duration following the end of the BSRP reception. Advantageously, the BSRs are included in QoS Data or QoS Null frames or Management frames (respectively 511 for STA1 and 512 for STA2).

Upon reception of the solicited BSRs, the AP analyses them (see FIG. 4).

Based on the non-AP stations' needs, the AP may decide to schedule transmission opportunities to the non-AP stations, including MU UL transmissions and DiL transmissions.

In the scenario shown, an MU cascading sequence is proposed during a TxOP gained by the AP.

The MU cascading mechanism has been introduced in the 802.11ax amendment, to allow alternating between Uplink (UL) and Down link (DL) data transmission quickly. The principle, is to alternate MU DL transmissions and MU UL transmissions during a single TXOP won by the AP.

This mechanism provides a low latency transmission for interactive applications, allows a better flexibility to the AP for the scheduling of the non-AP stations, and is also used in the scope of the TWT (Target Wake up time) to schedule in time different non-AP stations in power saving mode (typically sleeping) that negotiated a power saving contract with the AP.

In all those cases, the AP initiates the cascading sequence by sending one or more triggering frames 520 (MU PPDUs). The triggering frame 520 may be a mere 802.11 trigger frame or may be a DL data frame (MSDU) including a Trigger Response Scheduling (TRS) control subfield (in which case several triggering frames are sent to respective addressee non-AP stations). These frames provide an allocation of one or more resource units forming the communication channel, to the non-AP stations.

The trigger frame is broadcasted to all the non-AP stations, while each DL data frame with TRS is sent to a specific addressee non-AP station.

Upon receiving the triggering frame 520, each addressee non-AP station decodes the received MSDU and the included TRS subfield to know the allocation of a resource unit.

Similarly, in case of a trigger frame, each non-AP station determines whether its AID is specified in one of the User Info fields describing the allocation of the resource units forming the communication channel. In the affirmative (AID12 subfield of the User Info field equals to the 12 LSBs of its AID or takes a reserved value announcing a random resource unit), the non-AP station decodes the associated User Info field.

Thanks to the information provided in the User Info fields or the TRS control subfield, each non-AP station knows whether it has a resource unit assigned to it or not. In the affirmative, the triggering frame 520 also provides associated transmission parameters to use such as MCS (Modulation and Coding Scheme), Target RSSI, etc., as well as the length (duration) of the RU allocation (specified in a so-called UL LENGTH subfield for a trigger frame or indirectly specified in the UL Data Symbol subfield for the TRS control field).

In the present scenario, based on the received needs, the AP decides to first offer MU UL transmission to STA1 and STA4. To do so, the AP sends a trigger frame 520 where STA1 and STA4 are each allocated a resource unit (RU) for MU UL transmission.

Next, these non-AP stations create a MU UL data frame (HE TB PPDU) to be transmitted on the allocated RU to the AP.

To do so, the non-AP station first determines the transmission time (TxTime) that is granted by the AP, based on the indication provided in the triggering frame 200: UL LENGTH subfield for the trigger frame, in which case TxTime=(UL LENGTH)/3*4+24, or UL Data Symbol subfield (indicating the number of OFDM symbol of the Data portion of the HE TB PPDU to be transmitted in response) for TRS, in which case the combination of this information with the UL HE MCS subfield of the TRS control field provides the TxTime (since the HE TB PPDU preamble size is known). The non-AP station then determines, based on the MCS indicated by the AP, the amount of data that can be transmitted within the resource unit allocated.

Based on this information, it creates the MSDU packet (that can contain acknowledgements or new data) and then encapsulates it into a HE TB PPDU. The non-AP station then transmits it over the allocated resource unit a Short Inter Frame Space (SIFS) duration after the end of the reception of the triggering frame 520.

In the scenario shown, STA1 transmits HE TB PPDU 521 to the AP while STA4 transmits HE TB PPDU 522 to the AP.

Immediately after the transmission of the triggering frame 520, the AP listens to the medium, waiting for receiving the HE TB PPDUs 521/522. During the transmission period of the received HE TB PPDUs 521/522, the AP decodes the PPDUs (that are all intended to it).

A SIFS duration after the end of the transmission, the AP is allowed to take the medium again, and to use it to continue the cascading sequence of DL and UL transmissions until then end of the TxOP.

In the scenario shown, the AP wishes now to offer a DiL transmission opportunity to the peer stations STA2 and STA3 that have previously established a DiL session one with the other.

To do so, the AP creates a second triggering frame 530 indicating STA2 as the recipient of a DiL resource unit spanning the whole operating band. This means that no other transmission can occur in parallel of the STA2 transmission. The triggering frame 530 may be an 802.11 trigger frame or a MU DL PPDU addressed to STA2 and including a TRS control subfield.

In the case of a trigger frame, a single User Info field is provided assigning the sole RU (using all the operating band) to STA2. Furthermore, the allocated RU is indicated, in the triggering frame 530, as being dedicated for direct link transmission. Various signalling may be contemplated to provide this indication: using 1 bit (reserved bit in the current version of 802.11ax) of the User Info field; setting the AID12 field of the User Info field to a specific value indicating an RU for direct link while the AID of the peer station (STA2) is encoded in a specific format in the Trigger Dependent Info field of the User Info field; or using any meaningless (in the case of DiL) subfield of the User Info field itself, such as bits B12 to B31 to indicate the AID of the source peer station, the AID of the destination peer station, or an AID or identifier specific to the DiL session between those two peer stations. Any other signalling can be used in the context of the invention, provided the RU is marked as dedicated for DiL.

Equivalent signalling may be provided in the case of the TRS control field.

Next, the AP transmits the triggering frame 530 providing the peer stations (STA2 and STA3) with the DiL resource unit.

Because, it allocates an RU for Direct Link transmission, i.e. in which it is not involved, the AP set its Network Allocation Vector (NAV) to the effect of deferring its next medium access until the end of the DiL transmission, i.e. the end of the TxTime of the allocated RU. This aims at avoiding any collision with a DiL transmission that the AP could not detect (e.g. when STA3 is out of the AP's receiving range while being in STA2's range).

Upon reception of the triggering frame 530, peer STA2 determines from the received frame that it is allocated a DiL resource unit. STA2 determines the TxTime duration based on the parameter values received in the triggering fame 530 (e.g the UL Length field from the trigger frame, or the UL Data Symbol parameters and UL HE MCS from the TRS control field).

As the DiL duration is to be shared with peer STA3, STA2 determines a new transmission time TxTime2 corresponding to the time it has to transmit its own DiL data. In the scenario shown (with a transmission for each of STA2 and STA3), this is done by subtracting to the determined TxTime duration, 2 SIFS durations, and the duration required by the other peer station, STA3, to send its data or an acknowledgment (as in the proposed scenario).

Once TxTime2 is known, STA2 determines the optimum MCS value to transmit the data based on the SNR measured for instance during the last DiL transmission to STA3. Based on these MCS and TxTime2 values, STA2 can determine the amount of DiL data it can send to STA3. Consequently, STA2 creates DiL PPDU 531 and transmits it over the allocated DiL RU. DiL PPDUs preferably follow a Single User frame format.

STA3 receives DiL PPDU 531 on the DiL RU, decodes it, creates an acknowledgment packet 532, and transmits it to STA2, a SIFS duration after the end of the DiL PPDU reception time, over the same DiL RU. STA3 may for instance add a BSR in the acknowledgment packet 532 to declare its DiL needs to STA2.

If the amount of DiL data the peer stations exchange is not enough to use the allocated DiL RU during the whole TxTime, the peer station managing the allocated RU (here STA2) can transmit padding packets (not shown) over the RU until the end of the RU allocation in order to keep activity (to avoid legacy stations see the channel as idle and access it).

A SIFS duration after the end of the DiL RU allocation, the AP is allowed to take the medium again, and to use it to continue the cascading sequence of DL and UL transmissions until the end of the TxOP. In the scenario shown, a new MU UL transmission is triggered. Triggering frame 540 and resulting HE TB PPDUs 541, 542 sent by non-AP stations may be managed in a similar fashion to triggering frame 520 and resulting HE TB PPDUs 521, 522.

At the end of the TxOP, the AP may send a Multi STA block ACK packet 550 that acknowledges all the HE TB PPDUs received during the cascading sequence.

Although the scenario contemplates a cascading of two MU UL transmissions with a DiL transmission between them, other configurations may be envisioned, for instance starting the cascading with a DiL transmission, having several MU UL transmissions or several DiL transmissions on a row, providing MU DL transmissions between MU UL transmissions and/or DiL transmissions.

Figure 6A:
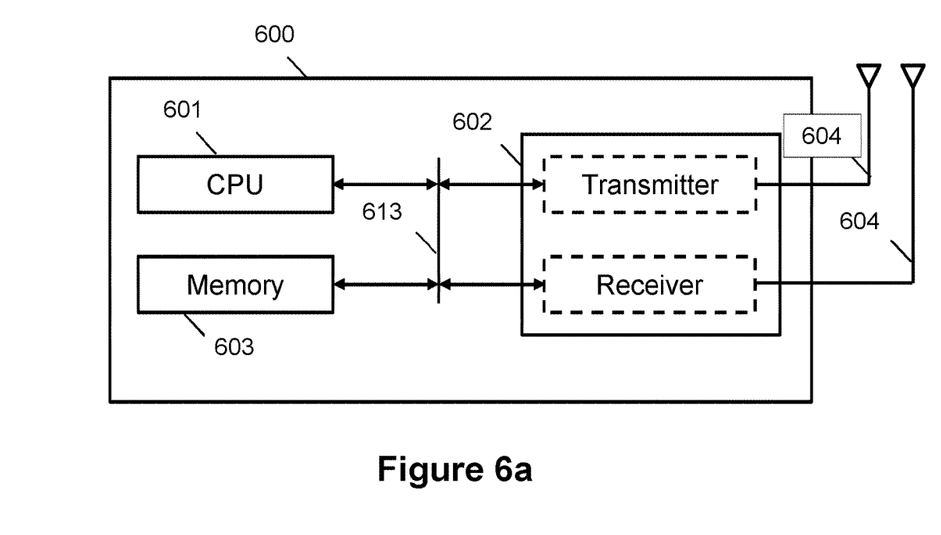
FIG. 6a shows a schematic representation a communication device in accordance with embodiments of the present invention.

FIG. 6a schematically illustrates a communication device 600, either a non-AP station 101-107 or the access point 110, of the radio network 100, configured to implement at least one embodiment of the present invention. The communication device 600 may preferably be a device such as a micro-computer, a workstation or a light portable device. The communication device 600 comprises a communication bus 613 to which there are preferably connected:
- a central processing unit 601, such as a processor, denoted CPU;
- a memory 603 for storing an executable code of methods or steps of the methods according to embodiments of the invention as well as the registers adapted to record variables and parameters necessary for implementing the methods; and
- at least one communication interface 602 connected to a wireless communication network, for example a communication network according to one of the IEEE 802.11 family of standards, via transmitting and receiving antennas 604.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The executable code may be stored in a memory that may either be read only, a hard disk or on a removable digital medium such as for example a disk. According to an optional variant, the executable code of the programs can be received by means of the communication network, via the interface 602, in order to be stored in the memory of the communication device 600 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

Figure 6B:
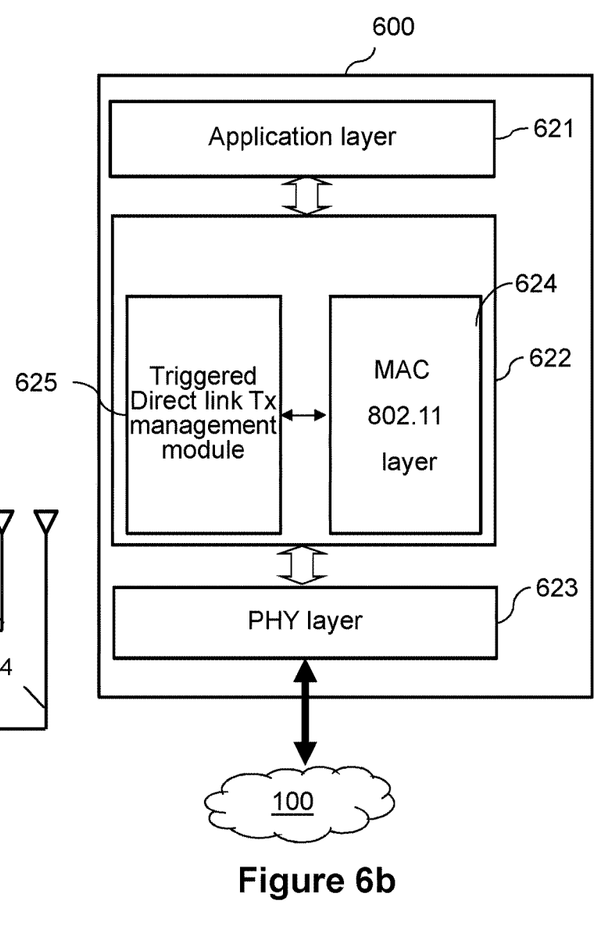
FIG. 6b shows a schematic representation of a wireless communication device in accordance with embodiments of the present invention.

FIG. 6b is a block diagram schematically illustrating the architecture of the communication device 600, either the AP 110 or one of stations 101-107, adapted to carry out, at least partially, the invention. As illustrated, device 600 comprises a physical (PHY) layer block 623, a MAC layer block 622, and an application layer block 621.

The PHY layer block 623 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 210 to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 622 preferably comprises an 802.11 MAC layer 624 implementing conventional 802.11ax MAC operations, and additional block 625 for carrying out, at least partially, the invention. The MAC layer block 622 may optionally be implemented in software, which software is loaded into RAM 603 and executed by CPU 601.

Preferably, the additional block 625, referred to as Triggered Direct Link Tx management module, implements the part of embodiments of the invention (either from station perspective or from AP perspective). This block performs the operations of FIGS. 3 and/or 4, depending on the role of the communication device 600.

802.11 MAC layer 624, Triggered Direct Link Tx management module 625 interact one with the other in order to process accurately communications over OFDMA RU addressed to multiple stations according to embodiments of the invention.

On top of the Figure, application layer block 621 runs an application that generates and receives data packets, for example data packets such as a video stream. Application layer block 621 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network, comprising at a peer station:
   providing, in a frame sent to a central station, a Buffer Status Report, BSR, control field reporting a status of buffered data,
   wherein a number of traffic identifiers for which there is buffered uplink, UL, traffic, is signaled using an Access Control Identifier, ACI, Bitmap subfield and a Delta Traffic Identifier, TID, subfield in the BSR control field,
   wherein one or more values from amongst values 0, 1 and 2 are used in the Delta TID subfield to signal buffered direct link, DiL, traffic when the ACI Bitmap subfield has no bit set to 1, and
   wherein one of the values is used in the Delta TID subfield to signal buffered DiL traffic when there is no buffered UL traffic and another separate value is used in the Delta TID subfield to signal buffered DiL traffic when there is buffered UL traffic for all traffic identifiers.

2. The method of claim 1, wherein the peer station belongs to a basic service set, BSS, managed by the central station and the signaling of the buffered DiL traffic by the ACI Bitmap subfield and the Delta TID subfield further signals whether the buffered DiL traffic is related to a DiL session with another peer station belonging to the BSS or not.

3. The method of claim 1, wherein an amount of buffered traffic including the buffered DiL traffic or an estimated transmission time required to transmit buffered traffic including the buffered DiL traffic is signaled in additional subfields of the BSR control field.

4. The method of claim 1, wherein the BSR control field reports a status of buffered DiL traffic stored in the peer station.

5. The method of claim 1, wherein the BSR control field reports a status of buffered DiL traffic stored in another peer station with which the peer station has established a DiL session.

6. The method of claim 1, wherein the frame including the BSR control field is sent in response to a BSR polling, BSRP, initiated by the central station, wherein the BSR polling specifies a type of the solicited BSR from amongst a DiL-only BSR, an UL-only BSR and a DiL-and-UL BSR.

7. The method of claim 6, wherein the BSR control field of the DiL-and-UL BSR type reports buffered DiL traffic and reports buffered UL traffic for a preferred access category, AC, only.

8. The method of claim 1, wherein one or more values from amongst values 2 and 3 are used in the Delta TID subfield to signal buffered DiL traffic when the ACI Bitmap subfield has one bit set to 1.

9. The method of claim 1, wherein value 3 is used in the Delta TID subfield to signal buffered DiL traffic when the ACI Bitmap subfield has two bits set to 1.

10. The method of claim 1, wherein the frame including the BSR control field is received in response to a BSR polling, BSRP, initiated by the central station, wherein the BSR polling specifies a type of the solicited BSR from amongst a DiL-only BSR, an UL-only BSR and a DiL-and-UL BSR.

11. The method of claim 1, wherein the frame is an 802.11 Quality of Service, QoS, Null frame or an 802.11 QoS Data frame.

12. The method of claim 1, further comprising, at the peer station:
   determining that UL traffic is buffered for two or more access categories, and
   responsive to determining there is (also) buffered DiL traffic, forcing to signal, in the BSR control field, buffered UL traffic for a single preferred access category.

13. A wireless communication device comprising at least one microprocessor configured for carrying out the steps of the method of claim 1.

14. A non-transitory computer-readable medium storing a program which, when executed by a microprocessor or computer system in a wireless device, causes the wireless device to perform the method of claim 1.

15. A communication method in a wireless network, comprising at a central station:
   receiving, from a peer station, a frame comprising a Buffer Status Report, BSR, control field reporting a status of buffered data,
      wherein a number of traffic identifiers for which there is buffered uplink, UL, traffic, is signaled using an Access Control Identifier, ACI, Bitmap subfield and a Delta Traffic Identifier, TID, subfield in the BSR control field,
      wherein one or more values from amongst values 0, 1 and 2 are used in the Delta TID subfield to signal buffered direct link, DiL, traffic when the ACI Bitmap subfield has no bit set to 1, and
      wherein one of the values is used in the Delta TID subfield to signal buffered DiL traffic when there is no buffered UL traffic and another separate value is used in the Delta TID subfield to signal buffered DiL traffic when there is buffered UL traffic for all traffic identifiers, and
   scheduling, based on the received BSR control field, a DiL resource unit to the peer station during a transmission opportunity granted to the central station.

* * * * *